(12) United States Patent
DePue et al.

(10) Patent No.: US 11,616,875 B2
(45) Date of Patent: *Mar. 28, 2023

(54) MESSAGING APPLICATION STICKER EXTENSIONS

(71) Applicant: Snap Inc., Santa Monica, CA (US)

(72) Inventors: Charles Burson DePue, Topanga, CA (US); Laurent Desserrey, Los Angeles, CA (US); Matthew Colin Grantham, Toronto (CA); Patrick Mandia, Venice, CA (US); David Whyte, Toronto (CA)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,982

(22) Filed: Jan. 6, 2022

(65) Prior Publication Data

US 2022/0131969 A1 Apr. 28, 2022

Related U.S. Application Data

(63) Continuation of application No. 16/810,399, filed on Mar. 5, 2020, now Pat. No. 11,252,274.
(Continued)

(51) Int. Cl.
*H04M 1/72427* (2021.01)
*H04L 51/046* (2022.01)
(Continued)

(52) U.S. Cl.
CPC ...... *H04M 1/72427* (2021.01); *H04L 51/046* (2013.01); *H04L 51/10* (2013.01); *H04M 1/72454* (2021.01); *H04M 1/72472* (2021.01)

(58) Field of Classification Search
CPC ..... H04L 51/06; H04L 51/063; H04L 51/066; H04L 51/08; H04L 51/10; H04M 1/72427;
(Continued)

(56) References Cited

U.S. PATENT DOCUMENTS 8,276,083 B2 * 9/2012 Nagata ............... H04N 1/00196
715/752
9,185,062 B1 * 11/2015 Yang .................... H04L 51/234
(Continued)

OTHER PUBLICATIONS

"U.S. Appl. No. 16/810,399, Non Final Office Action dated Jun. 8, 2021", 30 pgs.
(Continued)

*Primary Examiner* — Dung B Huynh
(74) *Attorney, Agent, or Firm* — Schwegman Lundberg & Woessner, P.A.

(57) ABSTRACT

Systems and methods are provided for performing operations including: receiving, with a messaging application implemented by one or more processors of a user device, a communication from a given application representing a first user interaction with the given application; generating, with the messaging application, a list of graphical elements based on the communication received from the given application; displaying, with the messaging application, the list of graphical elements; receiving, with the messaging application, a user selection of a first graphical element from the list of graphical elements; and incorporating, with the messaging application, the graphical element selected by the user into a message for transmission to another user.

20 Claims, 10 Drawing Sheets

Related U.S. Application Data

(60) Provisional application No. 62/908,332, filed on Sep. 30, 2019.

(51) Int. Cl.
  *H04L 51/10* (2022.01)
  *H04M 1/72454* (2021.01)
  *H04M 1/72472* (2021.01)

(58) Field of Classification Search
  CPC ........... H04M 1/7243; H04M 1/72454; H04M 1/72472; H04M 1/72–737
  See application file for complete search history.

(56) References Cited

U.S. PATENT DOCUMENTS

| | | | |
|---|---|---|---|
| 9,529,493 B2 | 12/2016 | Nakayama | |
| 9,607,332 B1* | 3/2017 | Nazarov | G06F 3/04817 |
| 10,362,078 B2 | 7/2019 | Trammell | |
| 10,545,657 B2* | 1/2020 | Zambetti | G06F 3/04886 |
| 10,659,405 B1* | 5/2020 | Chang | G06F 3/0481 |
| 10,866,731 B2* | 12/2020 | Yang | G06F 3/1423 |
| 2005/0091272 A1 | 4/2005 | Smith et al. | |
| 2005/0204309 A1* | 9/2005 | Szeto | G06F 3/0482 |
| | | | 715/861 |
| 2007/0038941 A1 | 2/2007 | Wysocki et al. | |
| 2008/0031251 A1* | 2/2008 | Rajan | H04M 1/7243 |
| | | | 370/392 |
| 2008/0133697 A1* | 6/2008 | Stewart | G06F 16/58 |
| | | | 709/217 |
| 2008/0165147 A1* | 7/2008 | Christie | G06F 3/0643 |
| | | | 345/173 |
| 2008/0222687 A1* | 9/2008 | Edry | H04L 51/04 |
| | | | 725/105 |
| 2008/0320419 A1* | 12/2008 | Matas | G01C 21/3664 |
| | | | 715/863 |
| 2009/0249247 A1* | 10/2009 | Tseng | G06F 3/0481 |
| | | | 715/835 |
| 2010/0125785 A1* | 5/2010 | Moore | H04M 1/7243 |
| | | | 345/173 |
| 2010/0179991 A1* | 7/2010 | Lorch | H04L 51/10 |
| | | | 715/810 |
| 2011/0087749 A1* | 4/2011 | Swink | H04W 4/12 |
| | | | 709/206 |
| 2011/0131494 A1 | 6/2011 | Ono et al. | |
| 2012/0011449 A1* | 1/2012 | Sasson | G06Q 30/0251 |
| | | | 715/752 |
| 2012/0266106 A1* | 10/2012 | Asaimuthu | G06F 3/04892 |
| | | | 715/835 |
| 2012/0272145 A1* | 10/2012 | Ryan | H04M 1/6091 |
| | | | 715/740 |
| 2013/0120295 A1* | 5/2013 | Kim | G06F 3/0486 |
| | | | 345/173 |
| 2013/0239063 A1* | 9/2013 | Ubillos | G06F 16/54 |
| | | | 715/838 |
| 2013/0262476 A1 | 10/2013 | Barak et al. | |
| 2014/0047027 A1* | 2/2014 | Moyers | G06F 9/452 |
| | | | 709/204 |
| 2014/0075513 A1 | 3/2014 | Trammel et al. | |
| 2014/0164507 A1* | 6/2014 | Tesch | H04L 51/10 |
| | | | 709/204 |
| 2014/0210708 A1* | 7/2014 | Simmons | G06F 3/04883 |
| | | | 345/156 |
| 2014/0229888 A1* | 8/2014 | Ko | G06F 3/0481 |
| | | | 715/783 |
| 2014/0365914 A1* | 12/2014 | Peng | H04L 51/18 |
| | | | 715/752 |
| 2015/0085317 A1* | 3/2015 | Kim | G06F 3/0488 |
| | | | 358/1.15 |
| 2015/0094106 A1* | 4/2015 | Grossman | H04M 1/72436 |
| | | | 455/466 |
| 2015/0095804 A1* | 4/2015 | Grossman | G06F 3/04845 |
| | | | 715/753 |
| 2015/0119002 A1* | 4/2015 | Chen | H04W 4/50 |
| | | | 455/414.1 |
| 2015/0121220 A1 | 4/2015 | Lee et al. | |
| 2015/0127753 A1* | 5/2015 | Tew | G06Q 30/0251 |
| | | | 709/206 |
| 2015/0172238 A1* | 6/2015 | Ahmed | H04N 21/4223 |
| | | | 709/217 |
| 2015/0178626 A1* | 6/2015 | Pielot | H04L 51/046 |
| | | | 706/12 |
| 2015/0193192 A1 | 7/2015 | Kidron | |
| 2015/0279313 A1* | 10/2015 | Yasuda | G06F 1/3209 |
| | | | 345/2.3 |
| 2015/0309720 A1* | 10/2015 | Fisher | G06F 3/04842 |
| | | | 715/752 |
| 2015/0332493 A1* | 11/2015 | Adamson, III | G06T 11/60 |
| | | | 345/471 |
| 2015/0370425 A1* | 12/2015 | Chen | G06F 3/0482 |
| | | | 715/830 |
| 2015/0372952 A1* | 12/2015 | Lefar | H04L 51/10 |
| | | | 709/206 |
| 2015/0378590 A1* | 12/2015 | Kim | H04L 51/046 |
| | | | 715/752 |
| 2016/0063011 A1 | 3/2016 | Wehbi et al. | |
| 2016/0117344 A1* | 4/2016 | Kleinpeter | G06F 16/1748 |
| | | | 707/748 |
| 2016/0124626 A1 | 5/2016 | Lee et al. | |
| 2016/0226806 A1* | 8/2016 | Weil | G06F 3/04845 |
| 2016/0259526 A1* | 9/2016 | Lee | H04L 51/04 |
| 2016/0261790 A1* | 9/2016 | Lee | H04M 1/72439 |
| 2016/0286028 A1* | 9/2016 | Ahuja | H04M 1/72436 |
| 2016/0337843 A1 | 11/2016 | Repka et al. | |
| 2016/0342949 A1* | 11/2016 | Takasuka | G06F 3/0485 |
| 2016/0360336 A1* | 12/2016 | Gross | H04W 4/025 |
| 2016/0360382 A1* | 12/2016 | Gross | G06F 9/453 |
| 2017/0003793 A1 | 1/2017 | Gao et al. | |
| 2017/0064206 A1 | 3/2017 | Ku et al. | |
| 2017/0093769 A1* | 3/2017 | Lind | G06F 3/1454 |
| 2017/0099358 A1* | 4/2017 | Perez | H04L 51/216 |
| 2017/0147189 A1* | 5/2017 | Ryu | G06F 3/04886 |
| 2017/0188214 A1* | 6/2017 | Liu | H04L 51/52 |
| 2017/0336926 A1* | 11/2017 | Chaudhri | H04L 51/18 |
| 2017/0357324 A1* | 12/2017 | Chaudhri | H04M 1/72439 |
| 2017/0358010 A1* | 12/2017 | Montague | G06Q 30/0275 |
| 2017/0359279 A1* | 12/2017 | Peterson | H04L 51/046 |
| 2017/0359461 A1* | 12/2017 | De Vries | H04M 1/725 |
| 2017/0364599 A1* | 12/2017 | Ohanyerenwa | G06F 16/48 |
| 2017/0373996 A1* | 12/2017 | Danesh-Bahreini | |
| | | | H04L 51/046 |
| 2018/0054405 A1* | 2/2018 | Ritch | G06F 16/48 |
| 2018/0077096 A1* | 3/2018 | DeMattei | H04L 51/58 |
| 2018/0083898 A1* | 3/2018 | Pham | H04L 51/046 |
| 2018/0083901 A1* | 3/2018 | McGregor, Jr. | H04L 51/10 |
| 2018/0137097 A1* | 5/2018 | Lim | G06F 40/279 |
| 2018/0145937 A1* | 5/2018 | Choi | H04L 51/10 |
| 2018/0173725 A1* | 6/2018 | De Guerre | G06F 16/5866 |
| 2018/0178132 A1* | 6/2018 | Ahlstrom | A63F 13/87 |
| 2018/0188951 A1* | 7/2018 | Kim | G06F 3/016 |
| 2018/0192240 A1 | 7/2018 | Liusaari et al. | |
| 2018/0205675 A1 | 7/2018 | Koo et al. | |
| 2018/0255009 A1* | 9/2018 | Chen | G06Q 50/01 |
| 2018/0278585 A1* | 9/2018 | Lurey | H04L 63/0428 |
| 2018/0300542 A1* | 10/2018 | Waddell | G06V 30/387 |
| 2018/0335939 A1* | 11/2018 | Karunamuni | G06F 3/0481 |
| 2018/0373683 A1* | 12/2018 | Hullette | G06Q 50/01 |
| 2019/0007421 A1 | 1/2019 | D et al. | |
| 2019/0066304 A1* | 2/2019 | Hirano | H04N 5/23293 |
| 2019/0104101 A1* | 4/2019 | Pique Corchs | H04L 51/56 |
| 2019/0235246 A1* | 8/2019 | Hu | G06F 3/011 |
| 2019/0286648 A1* | 9/2019 | Wan | G06F 16/5866 |
| 2019/0294259 A1* | 9/2019 | Liu | H04L 51/04 |
| 2019/0339822 A1* | 11/2019 | Devine | G06V 40/16 |
| 2020/0034033 A1* | 1/2020 | Chaudhri | H04L 51/063 |
| 2020/0057543 A1* | 2/2020 | Lin | G06F 3/013 |
| 2020/0059695 A1* | 2/2020 | Choi | H04N 21/4821 |
| 2020/0106728 A1 | 4/2020 | Grantham et al. | |
| 2020/0183574 A1* | 6/2020 | Chen | G06F 3/04883 |
| 2020/0196001 A1* | 6/2020 | Chih | H04N 21/431 |
| 2020/0201973 A1 | 6/2020 | Zhang | |

(56) References Cited

U.S. PATENT DOCUMENTS

| | | | |
|---|---|---|---|
| 2020/0242260 A1* | 7/2020 | Chen | G06V 10/40 |
| 2020/0356221 A1* | 11/2020 | Behzadi | H04M 1/72454 |
| 2020/0358726 A1* | 11/2020 | Dryer | H04L 51/046 |
| 2020/0380199 A1* | 12/2020 | Judovsky | H04L 51/04 |
| 2020/0402304 A1* | 12/2020 | Hwang | G06V 40/176 |
| 2021/0026504 A1* | 1/2021 | Apthorp | G06Q 50/01 |
| 2021/0084137 A1* | 3/2021 | Kang | G06Q 20/386 |
| 2021/0099568 A1 | 4/2021 | Depue et al. | |
| 2021/0146221 A1 | 5/2021 | Dalebout et al. | |

OTHER PUBLICATIONS

"U.S. Appl. No. 16/810,399, Notice of Allowance dated Oct. 6, 2021", 9 pgs.

"U.S. Appl. No. 16/810,399, Response filed Jul. 27, 2021 to Non Final Office Action dated Jun. 8, 2021", 11 pgs.

\* cited by examiner

MESSAGING APPLICATION STICKER EXTENSIONS

CROSS-REFERENCE TO RELATED APPLICATIONS

This application is a continuation of U.S. patent application Ser. No. 16/810,399, filed on Mar. 5, 2020, now issued as U.S. Pat. No. 11,252,274, which claims the benefit of priority to U.S. Provisional Patent Application Ser. No. 62/908,332, filed on Sep. 30, 2019, the entireties of each of which are hereby incorporated by reference herein.

TECHNICAL FIELD

The present disclosure relates generally to providing graphical elements using a messaging application.

BACKGROUND

Modern day user devices provide messaging applications that allow users to exchange messages with one another. Such messaging applications have recently started incorporating graphics in such communications. Users can select between various predetermined graphics to incorporate into their communications.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
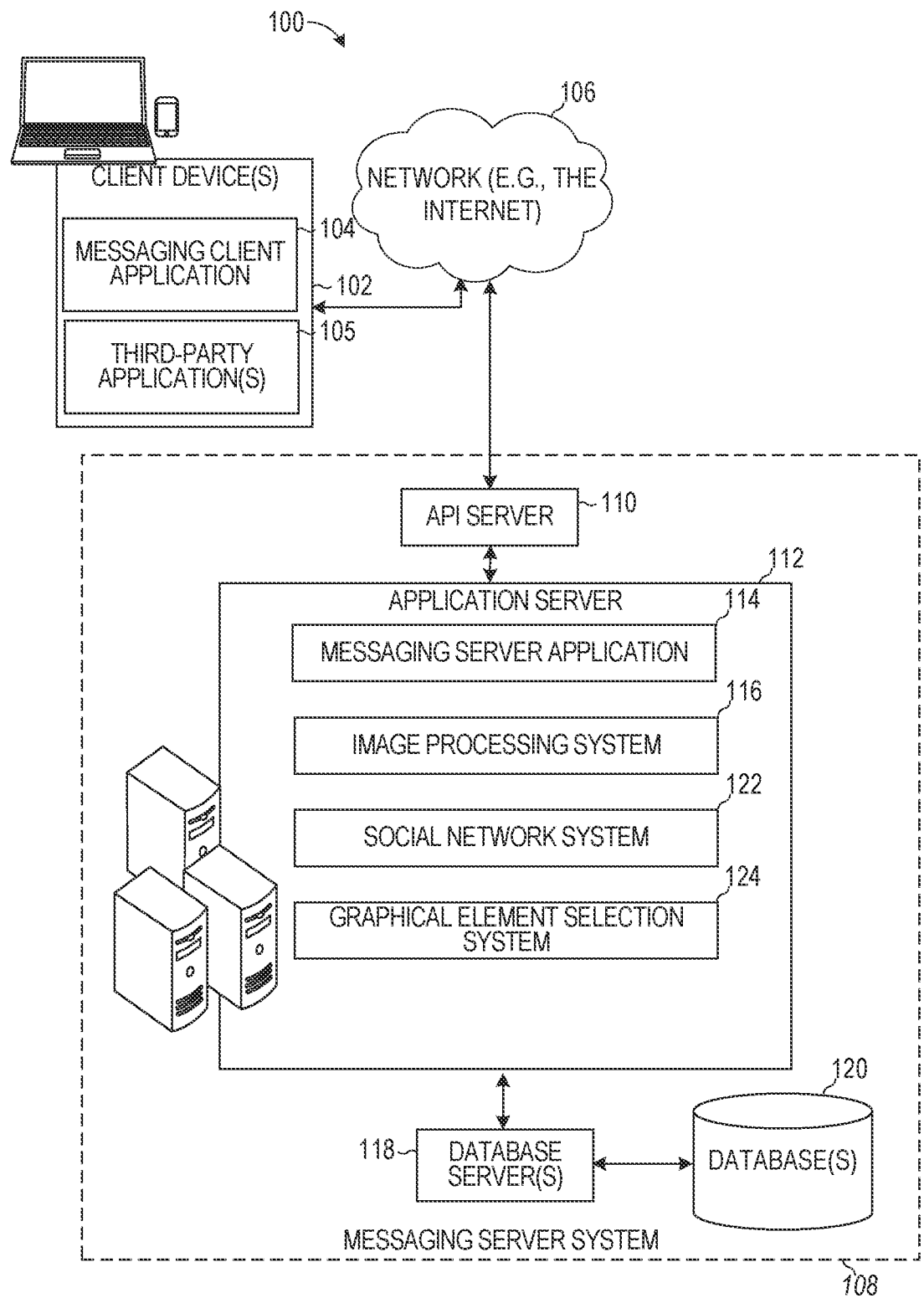
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, users exchange messages with each other using messaging applications. Such applications allow users to select from a predefined list of images and avatars to send to one another. Users are increasingly communicating with each other using such images and avatars to convey their thoughts. However, finding the right images or avatars to convey a particular thought can be tedious and time consuming. Specifically, the user has to manually search using keywords for a particular image or avatar that conveys a given message. This requires navigating through multiple pages of information until the desired image or avatar is found. Given the complexity and amount of time it takes to find the right image or avatar, users become discouraged from communicating using the images or avatars, which results in a waste of resources or lack of use.

Also, sometimes users are performing an activity on an application, such as an exercise or music application. If the user would like to share that activity with another user by sending an image or avatar through the messaging application, the user is forced to search through hundreds of images or avatars in the messaging application to find one that is suitable to share with the other user. Even still, the images or avatars available through the messaging application are typically of generic form and may not accurately reflect activities performed on other applications.

The disclosed embodiments improve the efficiency of using the electronic device by providing a system that intelligently selects and presents graphical elements for a user to send others in a messaging application based on activities a user performs with other applications. Specifically, according to the disclosed embodiments, a messaging application implemented by one or more processors of a user device receives a communication from a given application representing a first user interaction with the given application. The messaging application generates a list of graphical elements based on the communication received from the given application and displays that list of graphical elements. The messaging application receives a user selection of a first graphical element from the list of graphical elements and incorporates the graphical element selected by the user into a message for transmission to another user.

In some embodiments, the list of graphical elements is dynamically ordered based on the first user interaction with the given application. Specifically, the messaging application receives another communication from the given application representing a second user interaction with the given application and determines that the second user interaction took place more recently than the first user interaction. In response to determining that the second user interaction took place more recently than the first user interaction, the messaging application positions a second graphical element in the list of graphical elements associated with the first user interaction at a lower position in the list of graphical elements than a third graphical element associated with the second user interaction. As an example, the first user interaction represents a first song played by the given application, the second user interaction represents a second song played by the given application after the first song, the second graphical element identifies the first song, and the third graphical element identifies the second song.

In this way, the disclosed embodiments improve the efficiency of using the electronic device by reducing the number of screens and interfaces a user has to navigate through to find a graphical element to share with other users. This is done by receiving a communication from a connected application with the messaging application that represents user activity with the connected application and/or includes a graphical element generated by the connected application. The connected application can be a third-party application that is provided by an entity or organization that differs from the entity or organization that provides the messaging application. This reduces the device resources (e.g., processor cycles, memory, and power usage) needed to accomplish a task with the device.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and between a messaging client application 104 and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a graphical element selection system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. In an embodiment, the third-party application 105 can be accessed by the client device 102 to perform various activities and interactions, such as listening to music, videos, track exercises, view graphical elements (e.g., stickers), communicate with other users, and so forth.

As an example, the third-party application 105 can be a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

In some embodiments, the third-party application 105 is configured to share authentication information with the messaging client application 104. For example, the third-party application 105 can share authentication information with the messaging client application 104 based on the OAuth 2 flow framework. After the third-party application 105 is configured to share authentication information with the messaging client application 104 (e.g., after a user selects an option to connect the third-party application 105 with the messaging client application 104), the third-party application 105 can transmit one or more communications to the messaging client application 104. Such communications can include graphical elements or stickers generated by the third-party application 105 and/or contextual data representing user interactions with the third-party application 105. For example, the third-party application 105 may be a music application that transmits to the messaging client application 104 graphical elements representing music listened to by the user on the third-party application 105. Alternatively, the third-party application 105 may be a music application that transmits to the messaging client application 104 data representing music listened to by the user on the third-party application 105. The messaging client application 104 may then generate a list of graphical elements that include the graphical elements received from the third-party application 105 and/or that include graphical elements selected based on the information received from the third-party application 105.

To connect the third-party application 105 with the messaging client application 104, the messaging client application 104 presents a graphical user interface to a user that lists third-party applications 105 that are configured to be connected to the messaging client application 104. In an embodiment, this list may include only those applications that can provide contextual information and/or graphical elements to the messaging client application 104. After a user selects an option to connect to one of the applications in the list of third-party applications 105, the messaging client application 104 communicates an authentication token to an authentication server. The authentication token may include information from a user account with the messaging client application 104. The authentication token may uniquely identify the third-party application 105 selected by the user and may be associated with an expiration time. The third-party application 105 communicates with the authentication server to obtain the authentication token. Using the information contained in the authentication token (e.g., a username, a password, a user address, and so forth), the third-party application 105 is able to provide the user access to features of the third-party application 105 and is able to share information and transmit communications to the messaging client application 104.

Namely, a user can launch the third-party application 105 and, in response, the third-party application 105 communicates with the authentication server to determine whether the third-party application 105 has a valid token for the user. If the expiration time specified in the token has not yet been reached, the third-party application 105 retrieves the token and logs the user into the third-party application 105 using the information contained in the token. The third-party application 105 also transmits communications to the messaging client application 104 representing user interactions with the third-party application 105. If the expiration time has been reached or exceeded, the third-party application 105 can request that the messaging client application 104 renew the token to extend the expiration time. If the messaging client application 104 renews the token, the third-party application 105 automatically logs the user into the third-party application 105 and enables the user to access the features of the third-party application 105.

In some embodiments, the messaging client application 104 receives one or more communications from one or more third-party applications 105. The messaging client application 104 generates a list of graphical elements based on the communications it receives from the one or more third-party applications 105. The messaging client application 104 displays the list of graphical elements to a user and receives a user selection of a first graphical element from the list of graphical elements. In response to receiving the user selection, the messaging client application 104 incorporates the graphical element selected by the user into a message for transmission to another user.

As an example, the messaging client application 104 receives data representing music listened to by a user of a music application. The data may include graphical elements (cover arts) of each music item the user listened to and/or titles or identifiers of such music items. The messaging client application 104 obtains a list of graphical elements that includes graphical elements generated by the messaging client application 104 and graphical elements associated with other third-party applications 105. The messaging client application 104 adds one or more graphical elements associated with the music application to the list of graphical elements.

In an embodiment, the messaging client application 104 adds the graphical element (e.g., cover art) received from the music application. In an embodiment, the messaging client application 104 retrieves a graphical element based on the identifiers received from the music application for addition to the list of graphical elements. In some embodiments, the messaging client application 104 receives data representing exercise tracked by a user of an exercise application. In such cases, the exercise application provides a graphical element representing the exercise performed by the user and/or metric or statistic information representing the exercise. For example, if the user ran for 25 kilometers, the exercise application provides a graphical element showing a person running combined with text indicating 25 kilometers.

The list of graphical elements is presented to the user in a dedicated graphical element browsing interface and/or in a chat interface. In response to the user selecting a given graphical element from the list, the messaging client application 104 presents additional information associated with the graphical element and/or automatically sends the graphical element to a designated recipient. In some embodiments, the graphical elements include a universal resource locator (URL) which retrieves additional content associated with the graphical element in response to selection of the graphical element. Specifically, the graphical element may be interactive and when a recipient selects the graphical element or when the sender of the graphical element selects the graphical element, the URL is used to retrieve additional content (e.g., a webpage, music, video, images, or other content) for presentation to the user.

For example, if the user is in an active chat session with a second user and selects an option to view a list of graphical elements, the list of graphical elements may be presented to the user together with the chat messages exchanged between the users. If the user selects a given graphical element from the list, the messaging client application 104 automatically sends the selected graphical element to the second user with whom the user is in an active chat session. As another example, if the user is browsing graphical elements in a graphical element browsing interface, the messaging client application 104 presents options for sending a selected graphical element to another user. Specifically, the messaging client application 104 presents a list of possible recipients (e.g., a user's friends) and automatically sends the selected graphical element to one or more users selected by the user from the presented list.

In some embodiments, the graphical elements presented by the messaging client application 104 is dynamically ranked and ordered. In an example, the graphical elements are dynamically ranked and ordered based on recency of the user interaction with the third-party application 105 and/or based on time or other criteria. For example, a second graphical element in the list of graphical elements is in a first position in the list of graphical elements at a first point in time and is positioned lower in the list of graphical elements at a second point in time later than the first point in time. Specifically, the messaging client application 104 receives another communication from the third-party application 105 representing a second user interaction with the third-party application 105 and determines that the second user interaction took place more recently than the first user interaction. For example, the second user interaction represents a first song listened to by the user after or more recently than a second song listened to by the user on a music application. In response, the messaging client application 104 positions a second graphical element in the list of graphical elements associated with the first user interaction at a lower position in the list of graphical elements than a third graphical element associated with the second user interaction.

In some embodiments, the messaging client application 104 presents the list of graphical elements in different regions of a graphical user interface, where each region is associated with a respective third-party application 105. For example, the messaging client application 104 presents a first set of the graphical elements in the list of graphical elements in a first region dedicated to presenting graphical elements associated with a first third-party application 105 and presents a second set of the graphical elements in the list of graphical elements in a second region dedicated to presenting graphical elements associated with a second third-party application 105. In an embodiment, the regions are dynamically ordered and positioned based on recency of receiving communications from the respective third-party applications 105. For example, if the messaging client application 104 receives a communication from second third-party application 105 after receiving the communication from the first third-party application 105, the messaging client application 104 may place the second region above or ranked in a higher position than the first region. In some implementations, the third-party application 105 provides ranking information for the graphical elements associated with the third-party application 105. In such cases, the graphical elements presented by the messaging client application 104 in association with the third-party application 105 are ranked based on the ranking information received from the third-party application 105.

In some embodiments, the messaging client application 104 presents a graphical user interface that allows the user to view applications (e.g., connected applications including third-party applications 105) that have been previously authorized by the messaging client application 104 to share the authentication information from the messaging client application 104. The graphical user interface may include an option for each application that allows the user to instruct the messaging client application 104 to discontinue sharing the authentication information. In response to the user selecting the option to discontinue sharing the authentication information, the messaging client application 104 sends, to the authentication server, the specific identity of the third-party application 105 that is associated with the selected option and an indication to expire or revoke the token for that application. At a later point, the user can select an option to reconnect the application that has been disconnected, at which time the messaging client application 104 communicates to the authentication server the specific identity of the third-party application 105 that is associated with the selected option to reconnect and an indication to renew the token for that application.

In some embodiments, features of the messaging client application 104 are selectively enabled based on whether a given third-party application 105 has been connected to the messaging client application 104. For example, a feature to share media items with other applications can be in a disabled state when the given third-party application 105 has not yet been connected to the messaging client application 104. In response to the user selecting an option to share authentication information with the third-party application 105, the feature to share media items with other applications, and particularly with the third-party application 105, becomes enabled. The user can select and interact with the feature to automatically transmit to the third-party application 105 any media items that are captured, stored, and manipulated by the messaging client application 104. The third-party application 105, once connected, is configured to use an API of the messaging client application 104 to display or playback any of the media items that have been transmitted and shared with the third-party application 105 by the messaging client application 104. Namely, the media items may be configured to only be played using a video or image player (decoder) of the messaging client application 104 and the API enables the third-party application 105 to access the player of the messaging client application 104 to play the media items. In this way, because playback of the media items by the third-party application 105 is controlled by the API of the messaging client application 104, the messaging client application 104 can compute metrics or a view count for each media item even when such a media item is played or accessed by the third-party application 105 outside of the messaging client application 104. Specifically, a given media item may be transmitted and shared by the messaging client application 104 with first and second third-party applications 105. If such a media item is played 100 times by users of a first third-party application 105 and 200 times by users of a second third-party application 105 through the API of the messaging client application 104, the messaging client application 104 can track and determine that the view count of the particular media item is 300, even though the media item was accessed by the first and second third-party applications 105.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, graphical elements, geolocation information, media annotation and overlays, virtual objects, message content persistence conditions, social network information, and live event information, as examples. Data exchanges within the messaging system 100 are invoked and controlled through functions available via user interfaces (UIs) (e.g., graphical user interfaces) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., graphical elements, images or video) from a messaging client application 104 to a messaging server application 114, and for possible access by another messaging client application 104 or third-party application 105; a graphical element list; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the graphical element selection system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the graphical element selection system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The graphical element selection system 124 generates a list of graphical elements based on communications received from third-party applications 105.

In some embodiments, the graphical element selection system 124 communicates with the third-party applications 105 in accordance with the OAuth 2 flow framework. The graphical element selection system 124 communicates with the third-party application 105 to receive a communication (e.g., data or graphical elements) representing user interactions with the third-party application 105. The graphical element selection system 124 generates or modifies a list of graphical elements based on the received communication and presents the list of graphical elements to a user for selection and incorporation into a message transmitted to another user.

The application server 112 is communicatively coupled to a database server 118, which facilitates access to a database 120, in which is stored data associated with messages processed by the messaging server application 114. Database 120 may be a third-party database. For example, the application server 112 may be associated with a first entity, and the database 120 or a portion of the database 120 may be associated and hosted by a second different entity. In some implementations, database 120 stores user data that the first entity collects about various each of the users of a service provided by the first entity. For example, the user data includes user names, phone numbers, passwords, addresses, friends, activity information, preferences, videos or content consumed by the user, and so forth.

Figure 2:
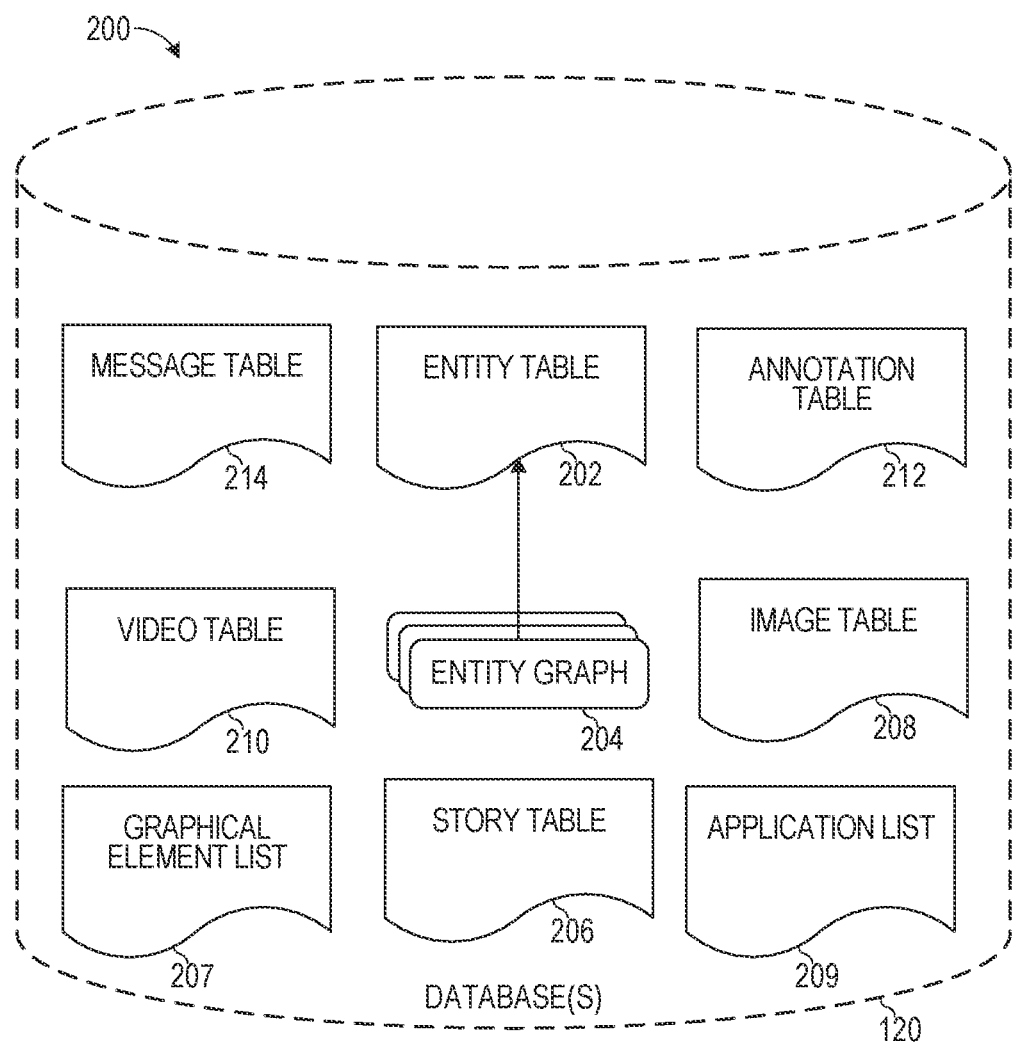
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Graphical element list 207 stores graphical elements generated by the messaging client application 104 and received from one or more third-party applications 105. Each graphical element in the list 207 may be associated with a time stamp that is used to reposition the graphical element in the graphical element list 207. Each graphical element in the list 207 may be associated with an application identifier that is used to position the graphical element in a graphical element display interface of the messaging client application 104. For example, the application identifier is used to place the graphical element in a dedicated region of a display associated with the respective application.

Application list 209 stores a list of all applications installed on a given client device 102. As new applications are installed on the given client device 102, the client device updates the application list 209 with the name and identity of the installed application. Application list 209 also stores a list of all the applications that are configured to share authentication information with the messaging client application 104 (e.g., applications that are connected with the messaging client application 104 and/or that can be selected to be connected with the messaging client application 104).

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
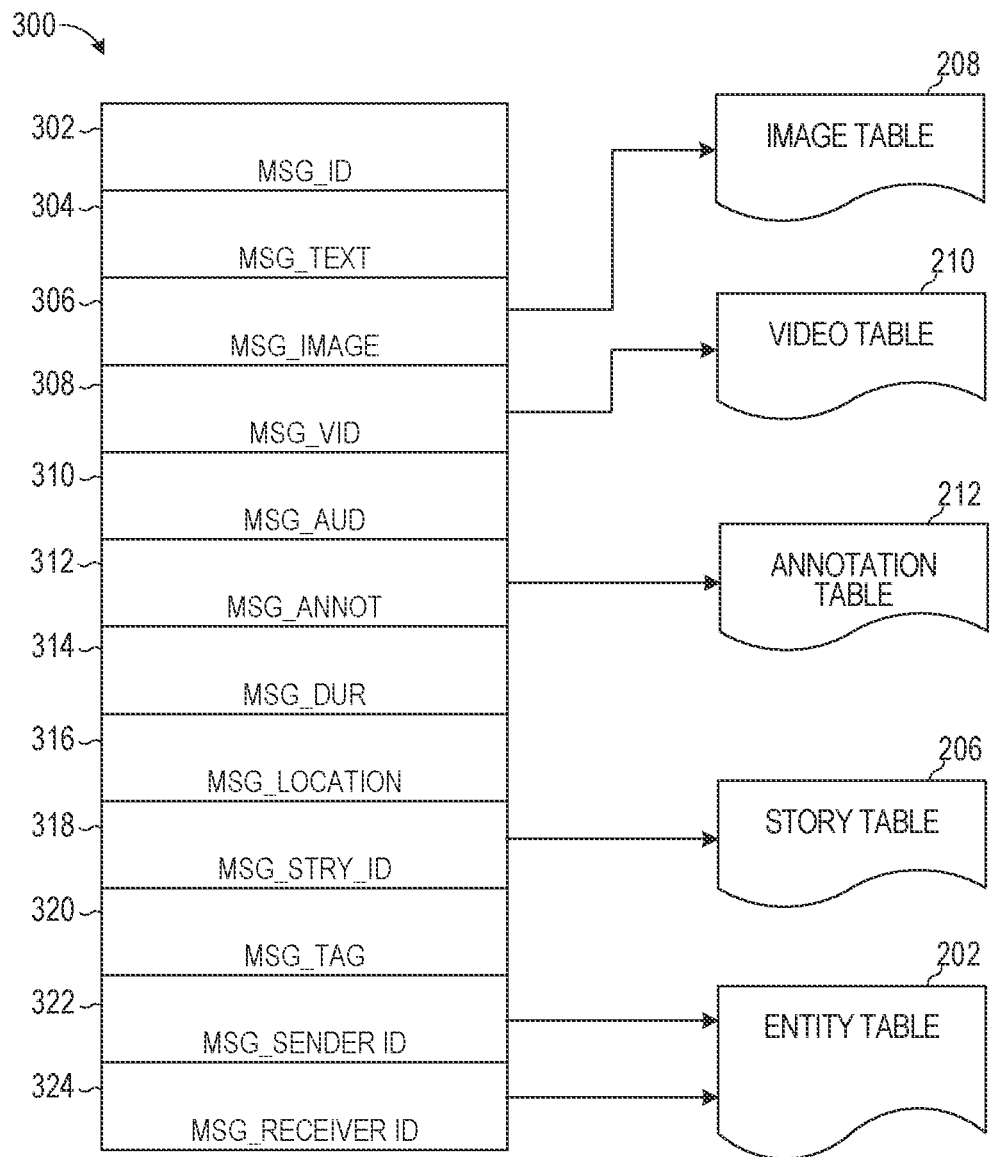
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

- A message identifier 302: a unique identifier that identifies the message 300.
- A message text payload 304: text, to be generated by a user via a UI of the client device 102 and that is included in the message 300.
- A message image payload 306: image data, captured by a camera component of a client device 102 or retrieved from memory of a client device 102, and that is included in the message 300.
- A message video payload 308: video data, captured by a camera component or retrieved from a memory component of the client device 102 and that is included in the message 300.
- A message audio payload 310: audio data, captured by a microphone or retrieved from the memory component of the client device 102, and that is included in the message 300.
- Message annotations 312: annotation data (e.g., filters, stickers, or other enhancements) that represents annotations to be applied to message image payload 306, message video payload 308, or message audio payload 310 of the message 300.
- A message duration parameter 314: parameter value indicating, in seconds, the amount of time for which content of the message (e.g., the message image payload 306, message video payload 308, message audio payload 310) is to be presented or made accessible to a user via the messaging client application 104.
- A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).
- A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.
- A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.
- A message sender identifier 322: an identifier (e.g., a messaging system identifier, email address, or device identifier) indicative of a user of the client device 102 on which the message 300 was generated and from which the message 300 was sent.
- A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
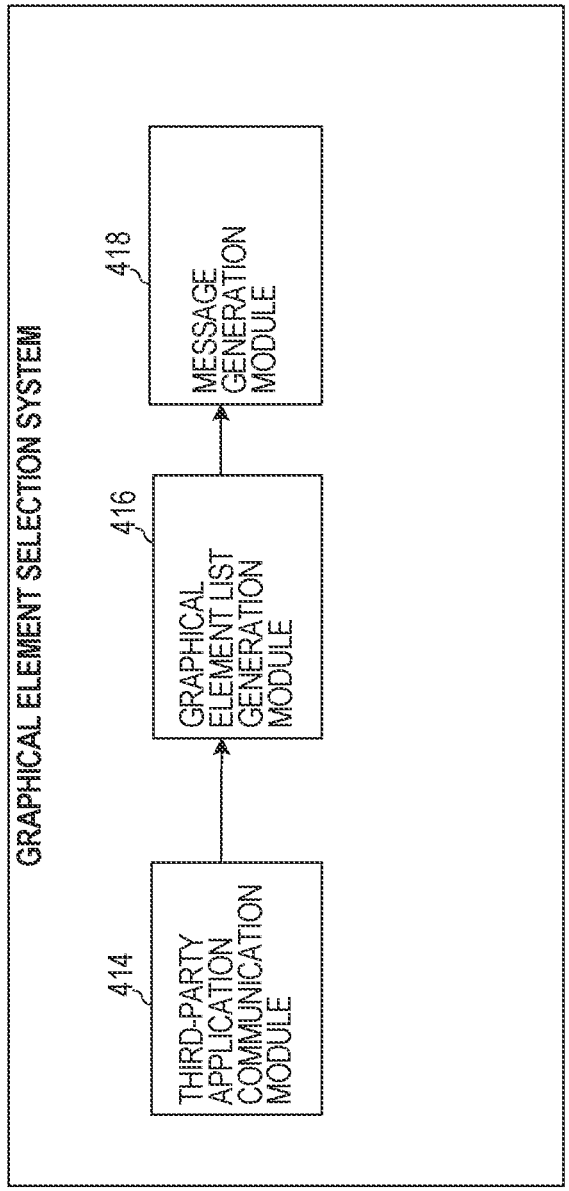
FIG. 4 is a block diagram showing an example graphical element selection system, according to example embodiments.

FIG. 4 is a block diagram showing an example graphical element selection system 124, according to example embodiments. Graphical element selection system 124 includes a third-party application communication module 414, a graphical element list generation module 416, and a message generation module 418.

Specifically, the third-party application communication module 414 allows a user to select one or more third-party applications 105 to connect to the messaging client application 104. As an example, a user may access a graphical user interface of the messaging client application 104 and request to search for third-party applications 105 that are configured to share and provide graphical elements to the messaging client application 104. The third-party application communication module 414 searches a list of third-party applications 105 that are installed on the user device to identify a set of the third-party applications 105 that are configured to share and provide graphical elements to the messaging client application 104. To do so, the third-party application communication module 414 may access a list stored on a server that identifies all of the possible third-party applications 105 that are configured to share and provide graphical elements to the messaging client application 104. Any application that is installed on the user device that is also on the list of applications stored on the server may be identified by the third-party application communication module 414 for inclusion in the set of the third-party applications 105.

The third-party application communication module 414 presents the set of third-party applications 105 with possibly a description of each application. Each application may be presented with a respective option to connect to the third-party application 105. In response to receiving a user selection of the connect option for a given third-party application 105, the third-party application communication module 414 communicates with the given third-party application 105 to establish and share authentication information in accordance with the OATH 2 framework. Once the given third-party application 105 is connected, the third-party application communication module 414 adds a respective graphical element display region to a list of graphical elements. The added graphical element display region may be configured to only display graphical elements from the given third-party application 105. The third-party application communication module 414 communicates with the given third-party application 105 to obtain an initial set of graphical elements generated by the third-party application 105 and may add that set of graphical elements to the graphical element display region of the given third-party application 105 that is displayed by the messaging client application 104.

As the user interacts with the given third-party application 105, the given third-party application 105 communicates such interactions to the third-party application communication module 414. As an example, the given third-party application 105 may be a music consumption application and the communications may identify an ordered list of music currently being consumed or consumed by the user in the past. The communications may include graphical elements for each song the user listens to on the music consumption application. As another example, the given third-party application 105 may be a video consumption application and the communications may identify an ordered list of videos currently being consumed or consumed by the user in the past. The communications may include graphical elements for each video the user watches on the video consumption application. The music or video graphical elements may be interactive and include respective URLs that allow another user to select to access the corresponding video or music associated with the graphical element. For example, if the user sends a graphical element associated with a first video to a second user, the second user can tap or click the graphical element and in response the URL is retrieved to view the first video. In an embodiment, the URL includes a play position such that the second user accesses the video or music from the same play position as the sender of the graphical element or from a play position selected by the sender of the graphical element.

As another example, the given third-party application 105 may be an exercise application and the communications may include exercise currently performed or performed recently by the user and/or metrics or statistics associated with the exercise. The exercise application may send a graphical element representing the exercise and/or including the metrics or statistics to the third-party application communication module 414. In some embodiments, the given third-party application 105 (e.g., the exercise application) provides a duration of the user interaction or the exercise performed by the user. The graphical element list generation module 416 may rank or order the graphical elements based on the duration of the user interaction, such that longer duration user interactions cause respective graphical elements to be positioned higher in the list than shorter duration user interactions.

As another example, the given third-party application 105 may be a graphical element search and generation application. In such cases, the user may be using the graphical element search and generation application to search and find and/or to create specific graphical elements. Such graphical elements are provided by the graphical element search and generation application to the third-party application communication module 414 for inclusion in the list of graphical elements generated by the graphical element list generation module 416. In some embodiments, the third-party applications 105 transmit identifiers of the graphical elements to the third-party application communication module 414. The identifiers are used by the third-party application communication module 414 to search and retrieve a corresponding graphical element from the list 207. In this way, the third-party applications 105 can manage the layout and display of graphical elements presented by the messaging client application 104. This reduces the amount of resources consumed by the messaging client application 104 and increases efficiency of the device.

The third-party application communication module 414 provides the graphical elements or information about the user interactions to the graphical element list generation module 416. In some embodiments, the graphical element list generation module 416 accesses the list of graphical elements stored in list 207. The graphical element list generation module 416 adds and/or reorders the graphical elements in the list of graphical elements based on the graphical elements and/or user interactions received from the third-party applications 105. In an example, the graphical element list generation module 416 places a graphical element representing a most recent user interaction above or ranked higher than another graphical element. Specifically, the graphical element list generation module 416 presents a graphical element representing a first song listened to after a second song above or higher ranked than the graphical element representing the second song.

In some embodiments, the graphical element list generation module 416 presents the list of graphical elements in different regions of a graphical user interface, where each region is associated with a respective third-party application 105. For example, the graphical element list generation module 416 presents a first set of the graphical elements in the list of graphical elements in a first region dedicated to presenting graphical elements associated with a first third-party application 105 and presents a second set of the graphical elements in the list of graphical elements in a second region dedicated to presenting graphical elements associated with a second third-party application 105. In an embodiment, the regions are dynamically ordered and positioned based on recency of receiving communications from the respective third-party applications 105. For example, if the graphical element list generation module 416 receives a communication from second third-party application 105 after receiving the communication from the first third-party application 105, the graphical element list generation module 416 may place the second region above or ranked in a higher position than the first region. In some implementations, the third-party application 105 provides ranking information for the graphical elements associated with the third-party application 105. In such cases, the graphical elements in the list generated by the graphical element list generation module 416 in association with the third-party application 105 are ranked based on the ranking information received from the third-party application 105.

In some embodiments, the graphical element list generation module 416 actively and dynamically modifies the graphical elements displayed in the list of graphical elements to the user. For example, the graphical element list generation module 416 may remove graphical elements that are older than a certain period of time (e.g., are older than 2 hours or 1 day). In some embodiments, the graphical element list generation module 416 receives contextual information from the third-party applications 105 and orders the list of graphical elements based on the contextual information. In some embodiments, contextual information received from a first third-party application 105 is used to rearrange or re-rank graphical elements associated with the first third-party application 105 and graphical elements associated with a second third-party application 105. For example, the graphical element list generation module 416 may receive an indication from an exercise application that the user completed a marathon. In response, the graphical element list generation module 416 may select a graphical element representing a marathon run for presentation in the list of graphical elements of the exercise application. In addition, the graphical element list generation module 416 may select a graphical element representing a movie about marathons for presentation in the list of graphical elements of a video consumption application.

The graphical element list generation module 416 provides the generated list of graphical elements to the message generation module 418. The message generation module 418 presents the list of graphical elements in an active chat interface and/or in a graphical element browsing interface. The message generation module 418 receives a user selection of a graphical element that is displayed to the user and allows the user to compose a message for transmission to another user. In an example, the message generation module 418 presents the graphical elements in a chat interface and selection of a graphical element from the list automatically transmits the selected graphical element to a user with whom the user is communicating in the chat interface. In another example, the message generation module 418 presents the graphical elements in a browsing interface. Selection of a graphical element in the browsing interface allows the user to add the selected graphical element to an image or video and then send the image or video with the added graphical element to a designated recipient.

Figure 5:
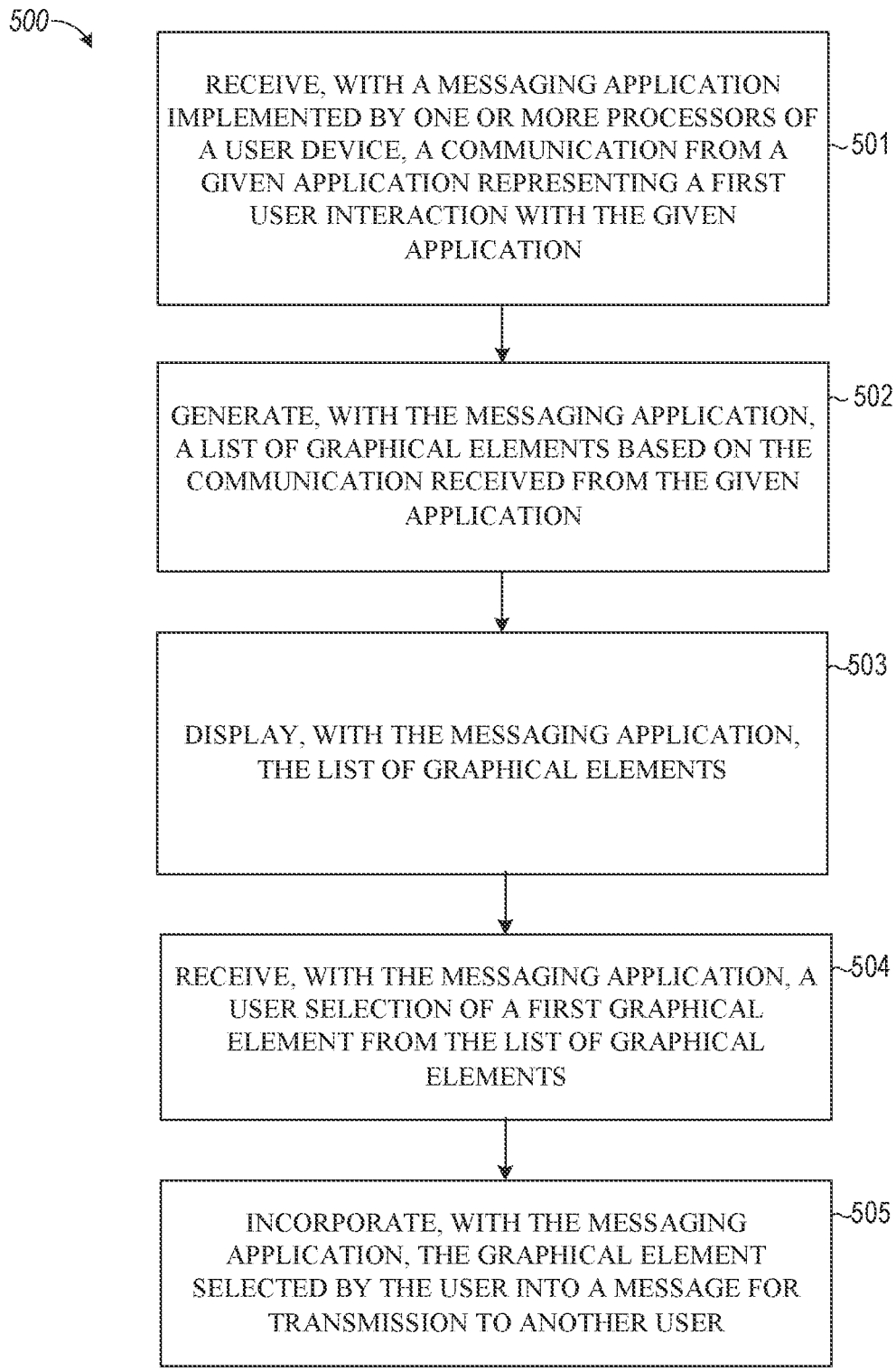
FIG. 5 is a flowchart illustrating example operations of the graphical element selection system, according to example embodiments.

FIG. 5 is a flowchart illustrating example operations of the graphical element selection system 124 in performing process 500, according to example embodiments. The process 500 may be embodied in computer-readable instructions for execution by one or more processors such that the operations of the process 500 may be performed in part or in whole by the functional components of the messaging server system 108 and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the graphical element selection system 124 receives a communication from a given application representing a first user interaction with the given application.

At operation 502, the graphical element selection system 124 generates a list of graphical elements based on the communication received from the given application.

At operation 503, the graphical element selection system 124 displays the list of graphical elements.

At operation 504, the graphical element selection system 124 receives a user selection of a first graphical element from the list of graphical elements.

At operation 505, the graphical element selection system 124 incorporates the graphical element selected by the user into a message for transmission to another user.

Figure 6:
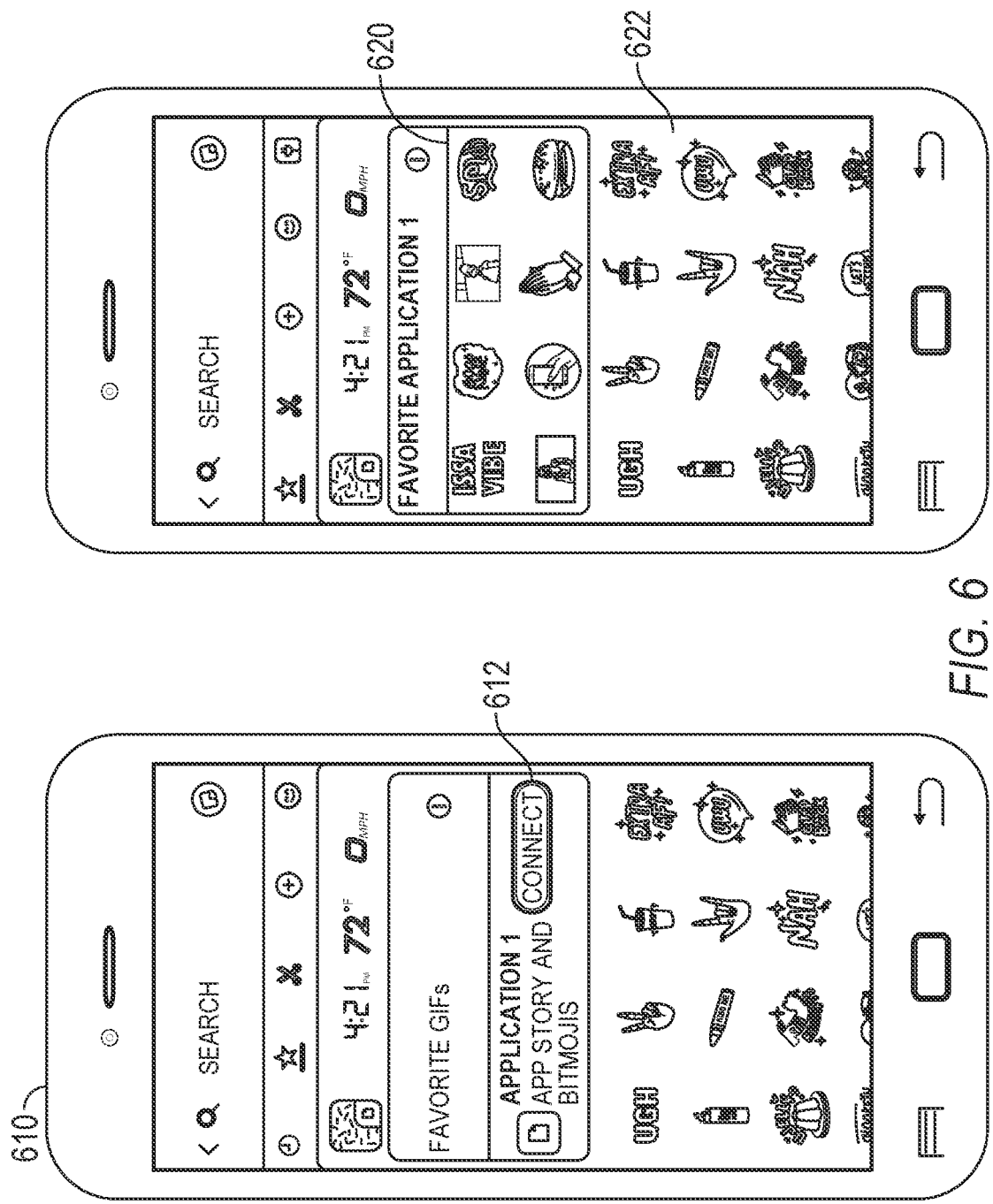
FIGS. 6-8 are illustrative inputs and outputs of the graphical element selection system, according to example embodiments.
Figure 7:
Figure 8:
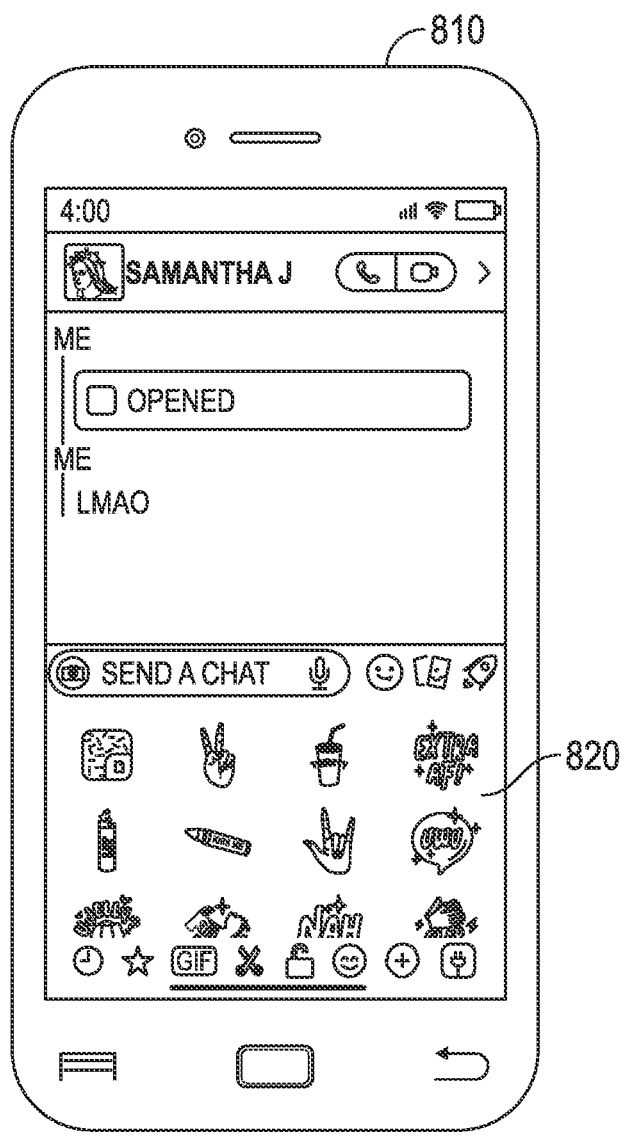

FIGS. 6-8 are illustrative inputs and outputs of the graphical element selection system 124, according to example embodiments. As shown in graphical user interface 610, the messaging client application 104 presents a list of third-party applications 105 that are configured to share and provide graphical elements to the messaging client application 104. The applications in the list shown are installed on the user device on which the messaging client application 104 is installed. Each application on the list is presented with a connect option to allow the user to connect the third-party application 105 with the messaging client application 104. For example, a first third-party application 105 is presented with a connect option 612.

In response to receiving a user selection of the connect option 612, the messaging client application 104 communicates with the first third-party application 105 to authenticate and begin sharing authentication and graphical element information with the first third-party application 105. In some implementations, this is performed in accordance with the OATH 2 framework. After the first third-party application 105 is connected to the messaging client application 104, the first third-party application 105 provides an initial set of graphical elements, generated by the first third-party application 105, to the messaging client application 104. This initial list of graphical elements may be a default list and may not be based on user interactions with the first third-party application 105. In some embodiments, the initial list of graphical elements provided by the first third-party application 105 may be provided by the first third-party application 105 based on a recent set of interactions the user performed with the first third-party application 105.

The messaging client application 104 presents the list of graphical elements received from the first third-party application 105 and/or the graphical elements selected based on data received from the first third-party application 105 in a dedicated region 620 of a browsing interface. Dedicated region 620 may be a separate region of the graphical user interface of the messaging client application 104 for presenting graphical elements associated with the first third-party application 105. Other dedicated regions (not shown) for presenting graphical elements associated with other applications may also be included together with the dedicated region 620.

Along with the graphical elements in the dedicated region associated with the first third-party application 105, the messaging client application 104 presents a second set of graphical elements 622. The second set of graphical elements 622 may be associated with graphical elements generated by the messaging client application 104 and/or another third-party application 105. In an embodiment, the graphical elements presented in dedicated region 620 and/or the second set of graphical elements 622 may be dynamically ordered based on context information received from one or more third-party applications 105 (e.g., the first third-party application 105).

In some embodiments, at a later point in time or an earlier point in time, the messaging client application 104 may receive a communication from the first third-party application 105 indicating that no graphical elements are available. For example, the first third-party application 105 may determine that a period of user inactivity has been exceeded. Specifically, if the first third-party application 105 determines that the user has not performed any interactions with the first third-party application 105 for more than 24 hours, the first third-party application 105 may inform the messaging client application 104 to remove some or all of the graphical elements associated with the first third-party application 105. In such cases, the messaging client application 104 presents a graphical user interface shown in FIG. 7 with an indicator 710 in the dedicated region 620. The indicator may inform the user that no graphical elements are currently available from the first third-party application 105. At a later time, the user can access the first third-party application 105 and perform a user interaction. In response, the first third-party application 105 communicates the user interaction and/or graphical element associated with the interaction to the messaging client application 104. As a result, the dedicated region 620 is updated to now include the graphical elements associated with the most recent interaction.

In some embodiments, the messaging client application 104 receives a user selection of a graphical element form the browser interface. In response, the messaging client application 104 presents a screen 720 that allows the user to capture an image or video and/or retrieve an image or video previously stored and modify the image or video using the selected graphical element. The user can select a send option 722 to cause the messaging client application 104 to send the modified image or video to a designated recipient.

In some embodiments, the messaging client application 104 presents a chat interface 810, as shown in FIG. 8. The chat interface allows a first user to communicate and exchange messages with a second user. During the chat session, the first user may request to view a list of graphical elements. In response, the messaging client application 104 presents a list of graphical elements 820 together with the chat interface (e.g., on the bottom of the chat interface). The list includes one or more graphical elements associated with a third-party application 105. For example, the list may include a graphical element received from the third-party application 105. In an embodiment, the list is dynamically updated based on user interactions received from the third-party application 105. In response to receiving a user selection of a given graphical element from the list of graphical elements 820, the messaging client application 104 automatically transmits the given graphical element to the second user in the chat interface.

In some embodiments, the list of graphical elements 820 may be organized, grouped, or separated into regions. Each region of the list of graphical elements 820 may be dedicated to presenting graphical elements from a respective third-party application 105. Each region may provide an identifier of the third-party application 105 from which the graphical elements were received or with which the graphical elements are associated.

Figure 9:
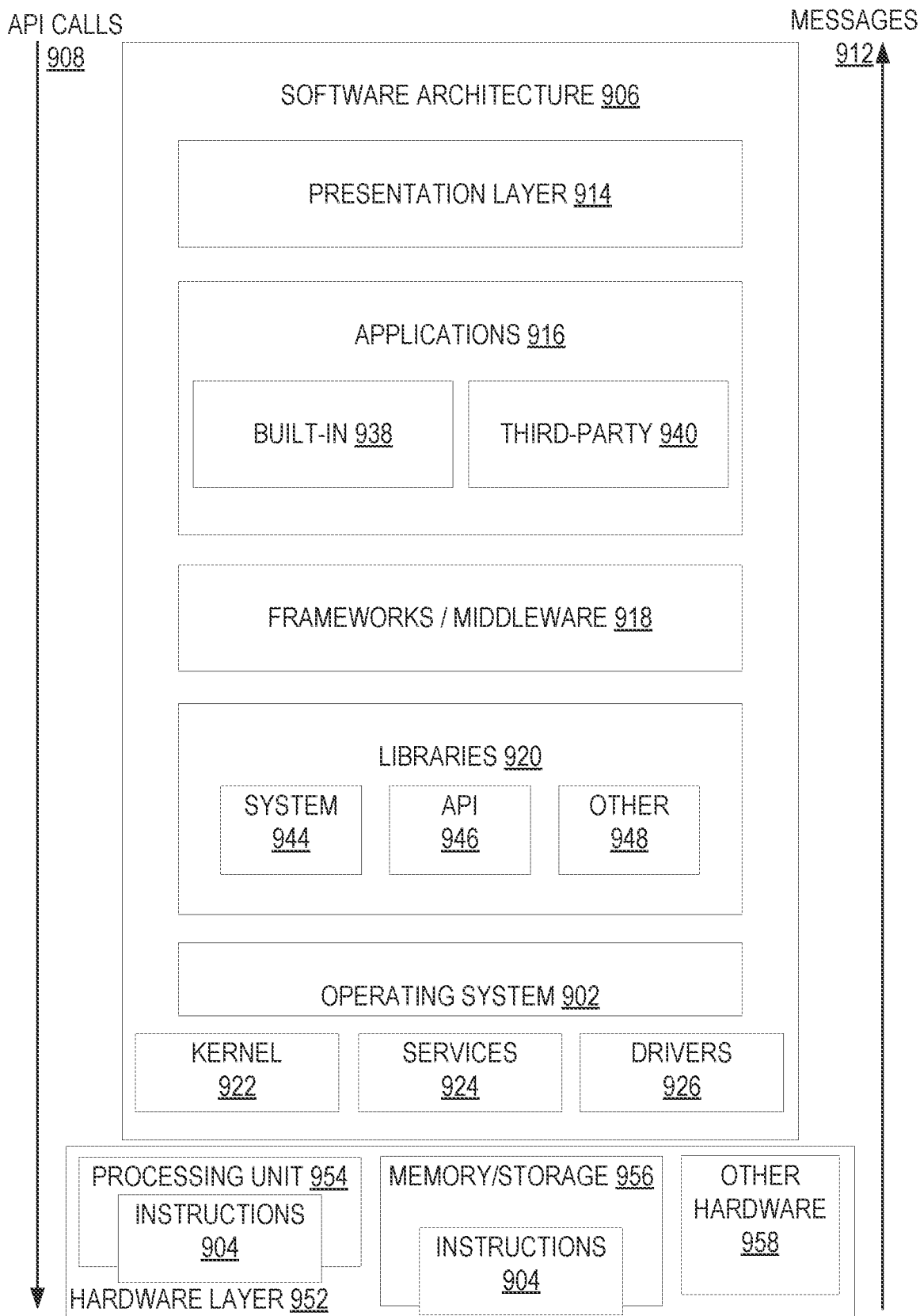
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
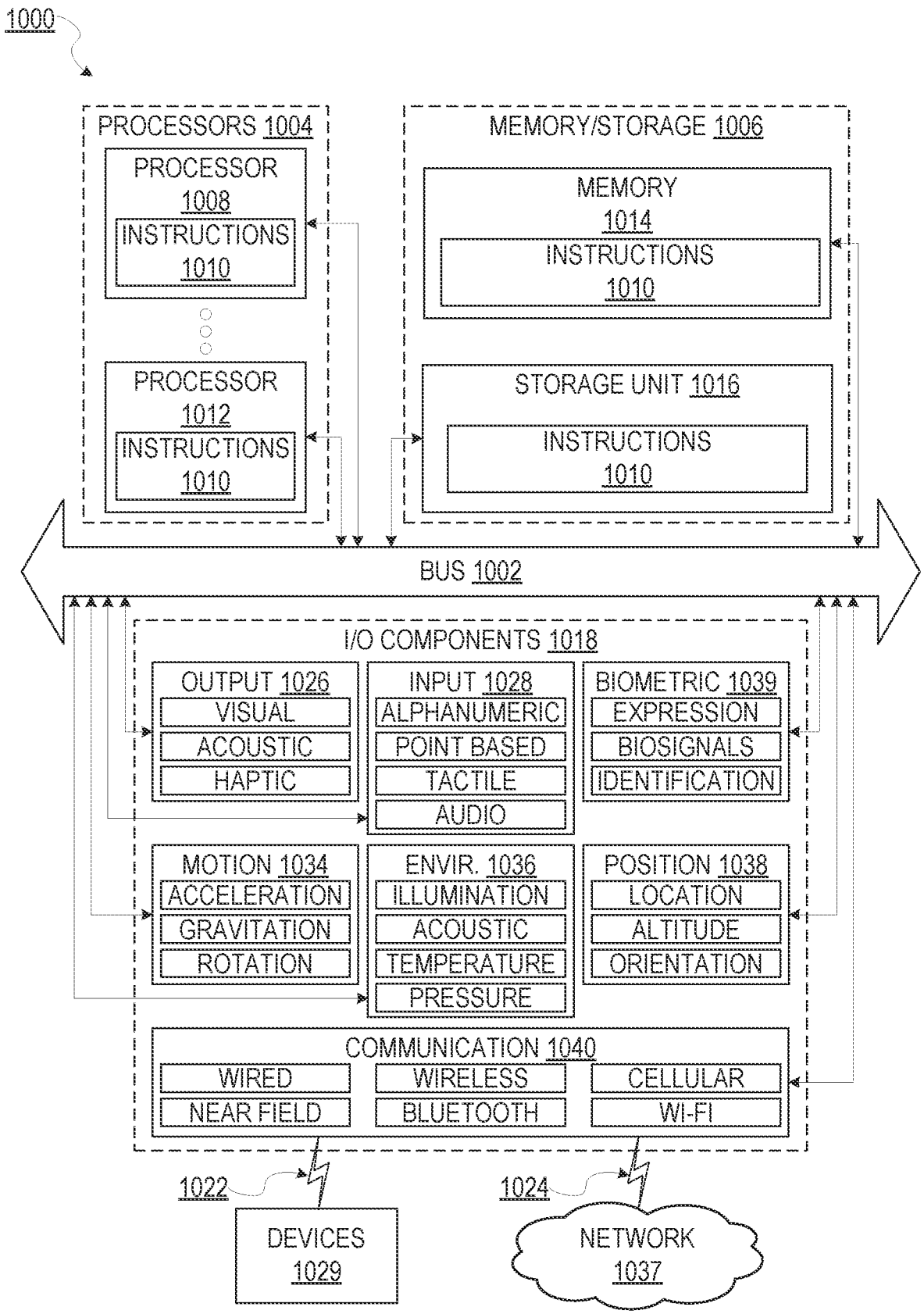
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000.

Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component, altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   generating, with a messaging application, a list of graphical elements corresponding to a given application;
   simultaneously displaying first and second sets of the graphical elements in the list of graphical elements, the first set of the graphical elements being displayed in a first region dedicated to presenting graphical elements associated with the given application and the second set of the graphical elements being displayed in a second region dedicated to presenting graphical elements associated with a second application; and
   incorporating, with the messaging application, a graphical element selected from the first or second sets of graphical elements into a message for transmission to a computing device associated with another user.

2. The method of claim 1, further comprising:
   receiving, with the messaging application, a communication from the given application representing a first user interaction with the given application; and
   receiving, with the messaging application, a user selection of the graphical element from the list of graphical elements.

3. The method of claim 2, wherein:
   the communication includes a second graphical element; and
   simultaneously displaying first and second sets of the graphical elements comprises combining the second graphical element received in the communication from the given application with one or more other graphical elements generated by the messaging application.

4. The method of claim 1, further comprising dynamically ordering the list of graphical elements based on a user interaction with the given application.

5. The method of claim 1, wherein a second graphical element in the list of graphical elements is in a first position in the list of graphical elements at a first point in time and is positioned lower in the list of graphical elements at a second point in time later than the first point in time.

6. The method of claim 1, further comprising:
   receiving, with the messaging application, a communication from the given application representing a second user interaction with the given application;
   determining that the second user interaction took place more recently than a first user interaction with the given application; and
   in response to determining that the second user interaction took place more recently than the first user interaction, positioning a second graphical element in the list of graphical elements associated with the first user interaction at a lower position in the list of graphical elements than a third graphical element associated with the second user interaction.

7. The method of claim 6, wherein the first user interaction represents a first song played by the given application, wherein the second user interaction represents a second song played by the given application after the first song; and wherein the second graphical element identifies the first song and the third graphical element identifies the second song.

8. The method of claim 1, wherein incorporating the graphical element into the message comprises adding the graphical element to an image that is sent to the computing device.

9. The method of claim 1, wherein one or more of the graphical elements in the list of graphical elements is associated with a universal resource locator that causes content associated with the corresponding one or more of the graphical elements to be presented.

10. The method of claim 1, wherein:
    the messaging application is provided by a first entity or organization; and
    the given application is provided by a second entity or organization different from the first entity or organization.

11. The method of claim 1, wherein:
    the given application is configured to share authentication information with the messaging application based on an open-standard authorization framework;

the graphical elements include at least one of an image, a video, an animation, a reference to content, or a sticker; and the simultaneously displaying first and second sets of the graphical elements further comprises selecting a second graphical element associated with the given application, the second graphical element determined to be contextually relevant to a communication received from the given application, and selecting a third graphical element associated with a second application, the third graphical element determined to be contextually relevant to the communication received from the given application.

12. The method of claim 1, further comprising:

displaying with the messaging application a list of applications that are available to provide graphical elements to the messaging application; and connecting the messaging application with the given application in response to receiving a user selection of the given application from the list of applications.

13. The method of claim 1, further comprising:

determining that no graphical elements is currently associated with a third application; and displaying an indicator in a third region dedicated to presenting graphical elements associated with the third application, the indicator indicating that no graphical elements is currently associated with the third application.

14. The method of claim 1, further comprising:

receiving ranking information from the given application, and ranking the list of graphical elements based on the ranking information received from the given application.

15. The method of claim 1, further comprising:

receiving a duration of a first user interaction from the given application; and ranking the list of graphical elements based on the duration of the first user interaction.

16. The method of claim 1, wherein the given application is an exercise application, wherein a first user interaction received from the given application corresponds to exercise performed by the user tracked by the exercise application;

and wherein a communication received from the given application includes a second graphical element that represents a type of exercise performed by the user and a metric or statistic associated with the exercise performed by the user.

17. A system comprising:

a processor configured to perform operations comprising:

generating, with a messaging application, a list of graphical elements corresponding to a given application;

simultaneously displaying first and second sets of the graphical elements in the list of graphical elements, the first set of the graphical elements being displayed in a first region dedicated to presenting graphical elements associated with the given application and the second set of the graphical elements being displayed in a second region dedicated to presenting graphical elements associated with a second application; and incorporating, with the messaging application, a graphical element selected from the first or second sets of graphical elements into a message for transmission to a computing device associated with another user.

18. The system of claim 17, wherein the operations further comprise:

receiving, with the messaging application, a communication from the given application representing a first user interaction with the given application; and receiving, with the messaging application, a user selection of the graphical element from the list of graphical elements.

19. The system of claim 18, wherein:

the communication includes a second graphical element; and simultaneously displaying first and second sets of the graphical elements comprises combining the second graphical element received in the communication from the given application with one or more other graphical elements generated by the messaging application.

20. A non-transitory machine-readable storage medium that includes instructions that, when executed by one or more processors of a machine, cause the machine to perform operations comprising:

generating, with a messaging application, a list of graphical elements corresponding to a given application;

simultaneously displaying first and second sets of the graphical elements in the list of graphical elements, the first set of the graphical elements being displayed in a first region dedicated to presenting graphical elements associated with the given application and the second set of the graphical elements being displayed in a second region dedicated to presenting graphical elements associated with a second application; and incorporating, with the messaging application, a graphical element selected from the first or second sets of graphical elements into a message for transmission to a computing device associated with another user.

* * * * *